United States Patent
Höhnke et al.

(10) Patent No.: US 9,871,887 B2
(45) Date of Patent: Jan. 16, 2018

(54) METHOD FOR ACCESS TO AN OPERATING SYSTEM, REMOVABLE MEMORY MEDIUM AND USE OF A REMOVABLE MEMORY MEDIUM

(75) Inventors: Thorsten Höhnke, Königsbrunn (DE); Susanne Pudlitz, Scheuring (DE)

(73) Assignee: Fujitsu Technology Solutions Intellectual Property GmbH (DE)

( * ) Notice: Subject to any disclaimer, the term of this patent is extended or adjusted under 35 U.S.C. 154(b) by 645 days.

(21) Appl. No.: 13/884,992

(22) PCT Filed: Sep. 28, 2011

(86) PCT No.: PCT/EP2011/066902
§ 371 (c)(1),
(2), (4) Date: Jun. 11, 2013

(87) PCT Pub. No.: WO2012/069239
PCT Pub. Date: May 31, 2012

(65) Prior Publication Data
US 2013/0290396 A1    Oct. 31, 2013

(30) Foreign Application Priority Data
Nov. 23, 2010    (DE) .................. 10 2010 052 246

(51) Int. Cl.
*G06F 15/16* (2006.01)
*H04L 29/08* (2006.01)
(Continued)

(52) U.S. Cl.
CPC .............. *H04L 67/34* (2013.01); *G06F 9/441* (2013.01); *G06F 21/575* (2013.01)

(58) Field of Classification Search
None
See application file for complete search history.

(56) References Cited

U.S. PATENT DOCUMENTS

2003/0188001 A1* 10/2003 Eisenberg ............... H04L 29/06
709/229
2004/0221163 A1* 11/2004 Jorgensen ........... H04L 63/0428
713/182
(Continued)

FOREIGN PATENT DOCUMENTS

WO        2008/122755 A1    10/2008

OTHER PUBLICATIONS

Written Opinion of the International Searching Authority of PCT application No. PCT/EP2011/066902, dated Dec. 23, 2011.*
(Continued)

*Primary Examiner* — Lance Leonard Barry
*Assistant Examiner* — Mohammad Yousuf A Mian
(74) *Attorney, Agent, or Firm* — DLA Piper LLP (US)

(57) ABSTRACT

A method of accessing an operating system in a distributed computer arrangement comprising loading an auxiliary operating system from a write-protected area of a removable storage medium, executing the loaded auxiliary operating system on a first computer, setting up a data link between the first computer and a second computer via a data network under control of the auxiliary operating system, executing a main operating system on the second computer and progressively transmitting inputs from a user from the first computer via the data link to the main operating system, and progressively transmitting outputs from the main operating system via the data link to the first computer.

10 Claims, 3 Drawing Sheets

(51) Int. Cl.
*G06F 9/44* (2006.01)
*G06F 21/57* (2013.01)

(56) References Cited

U.S. PATENT DOCUMENTS

| | | | | |
|---|---|---|---|---|
| 2007/0143837 | A1* | 6/2007 | Azeez | H04L 63/0209 726/11 |
| 2007/0257104 | A1* | 11/2007 | Owen et al. | 235/380 |
| 2009/0070576 | A1* | 3/2009 | Hocking | G06F 21/575 713/2 |
| 2009/0204964 | A1 | 8/2009 | Foley et al. | |
| 2012/0011354 | A1* | 1/2012 | Owen | G06F 9/4408 713/2 |
| 2012/0084545 | A1* | 4/2012 | Farina | G06F 21/575 713/2 |
| 2012/0110567 | A1* | 5/2012 | Lyons | G06F 8/61 717/177 |
| 2012/0150992 | A1* | 6/2012 | Mays | G06F 9/4443 709/217 |

OTHER PUBLICATIONS

International Search Report of PCT Application No. PCT/EP2011/066902, dated Dec. 23, 2011.*

Wikipedia: "Live-System" (Abstract), Nov. 19, 2010, pp. 1-5, XP55014667, de.wikipedia.org; URL: http://de.wikipedia.org/w/index.php?title=Live-System&oldid=81673663.

* cited by examiner

METHOD FOR ACCESS TO AN OPERATING SYSTEM, REMOVABLE MEMORY MEDIUM AND USE OF A REMOVABLE MEMORY MEDIUM

TECHNICAL FIELD

This disclosure relates to a method of accessing an operating system in a distributed computer arrangement, a removable storage medium having a write protected memory area and use of the removable storage medium.

BACKGROUND

Various methods of accessing an operating system in distributed computer arrangements are known.

In conventional client/server systems, sometimes also called "fat client" systems, a special piece of terminal client software is used on an access computer and essentially permits remote control of a host computer intended to be accessed. In that case, the host computer runs a piece of terminal server software which responds to remote access requests such as file or database requests from the terminal client software for resources of the host computer. Requests are sometimes handled locally on the access computer and sometimes handled remotely on the host computer.

More recently, in what are known as "thin clients" or virtualization solutions, almost all requisite hardware and software components are arranged on the host computer. In that case, the access computer now has only very simplified hardware such as what is known as a zero client chip to display computer outputs transmitted via a local area network and to capture and return user inputs, for example, using the remote desktop protocol (RDP). In contrast, a desired application is executed on the host computer, which also provides the computation power that is necessary for this.

The known methods are also suitable to access functions of an operating system on the host computer from a remote access computer. The need for special hardware or software to set up a connection such as the terminal client software for conventional client/server solutions or the special zero client hardware to access virtualization systems, partially restricts this fundamental mobility again, however. In particular, it is not readily possible to use an extraneous computer such as a computer in an internet cafe or a privately used home computer to access an operating system on a computer at the desk in a company network.

A known approach to a solution involves providing terminal client software or other access software to access an operating system on a host computer via a data network, particularly the internet, for download and executing it on the extraneous computer. However, this approach has a series of disadvantages and security gaps.

First, the provider of the access software normally needs to keep it in various versions for various operating systems of the possible access computers, for example, one version for Mac OS X, one version for Windows XP and a further version for Windows 7. This results both in increased outlay write and provision the software and in an increase in possible sources of error during the use and configuration thereof.

Second, the provider is unable to ensure the environment in which the access software is executed. If the access software is executed under an operating system contaminated with viruses, for example, there is the possibility that data presented or transmitted by the access software are intercepted by a piece of malicious malware and forwarded to third parties or that the malware causes damage on the host computer. Particularly in the case of security-relevant data from company networks, this means an often significant security risk, which means that such options to access an operating system from an extraneous computer are not provided.

It could therefore be helpful to provide an option to securely access an operating system which solves or at least alleviates the programs described. In particular, it could be helpful to provide a method and the software and hardware architecture necessary for implementation thereof which protect such access against attacks by viruses or other malware.

SUMMARY

We provide a method of accessing an operating system in a distributed computer arrangement including loading an auxiliary operating system from a write protected area of a removable storage medium, executing the loaded auxiliary operating system on a first computer, setting up a data link between the first computer and a second computer via a data network under control of the auxiliary operating system, executing a main operating system on the second computer, and progressively transmitting inputs from a user from the first computer via the data link to the main operating system, and progressively transmitting outputs from the main operating system via the data link to the first computer.

We also provide a removable storage medium having at least one write protected memory area and an auxiliary operating system stored in the write protected memory area, wherein the write protected memory area stores program code that executes executing the auxiliary operating system loaded from the removable storage medium on a first computer, setting up a data link between the first computer and a second computer via a data network under control of the auxiliary operating system, transmitting inputs from a user on the first computer via the data link to a main operating system executed on the second computer, and outputting outputs from the main operating system transmitted via the data link with the first computer.

We further provide an arrangement including a removable storage medium having at least one write protected memory area including an auxiliary operating system and program code that sets up a data link between a first compute and a second computer stored therein, wherein the first computer has an interface that connects the removable storage medium and a processor that executes the auxiliary operating system stored on the removable storage medium, the second computer has at least one processor that executes a main operating system, and the first computer and the second computer connect to one another via at least one data network.

LIST OF REFERENCE SYMBOLS

Figure 1:
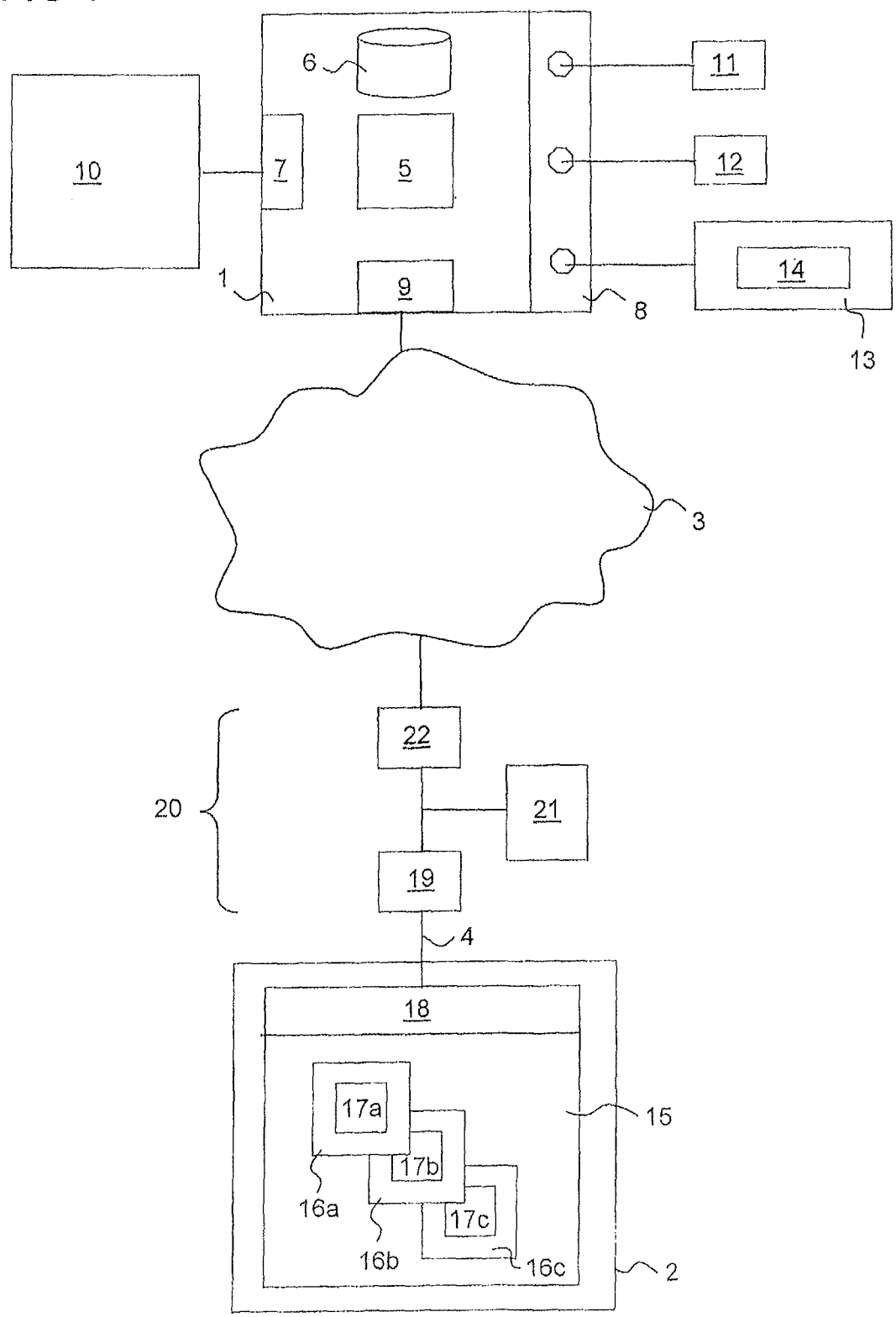
FIG. 1 shows a distributed computer arrangement including a first computer and a second computer.

1 Access computer
2 Host computer

3 Internet
4 Company network
5 Processor
6 Hard disc
7 Graphics component
8 USB interface controller
9 Network interface controller
10 Display unit
11 Keyboard
12 Computer mouse
13 Removable storage medium
14 Write protected memory area
15 Virtualization system
16 Virtual computer workstation
17 Operating system
18 Access control
19 First firewall
20 Demilitarized zone
21 DMZ host computer
22 Second firewall
23 Nonvolatile memory
24 Microcontroller
25 Data interface
26 Encryption unit
27 Memory area which is not write protected
28 Read only memory
29 Auxiliary operation system
30 Access software
31-39 Method steps

DETAILED DESCRIPTION

We provide a method of accessing an operating system in a distributed computer arrangement having the following steps:
 an auxiliary operating system is loaded from a write protected area of a removable storage medium;
 the loaded auxiliary operating system is executed on a first computer;
 a data link is set up between the first computer and a second computer via a data network under the control of the auxiliary operating system;
 a main operating system is executed on the second computer; and
 inputs from a user are progressively transmitted from the first computer via the data link to the main operating system, and outputs from the main operating system are progressively transmitted via the data link to the first computer.

The method described above takes advantage of the use of an auxiliary operating system from a write protected area of a removable storage medium to set up a data link between the first computer, particularly an access computer which is unknown to the data network, and a second computer, particularly a host computer in a closed network. The use of the removable storage medium means that a user is always able to carry the auxiliary operating system, as a result of which use at virtually any desired access computer is possible. Since the auxiliary operating system is stored in a write protected area of the removable storage medium, there is no risk of the auxiliary operating system becoming infected with a virus or similar malware by the access computer. In addition, it does not matter which operating system is installed on the access computer since it is not needed to set up the data link.

The method may be characterized in that the second computer runs a virtualization system to provide virtual computer workstations, and the main operating system is executed on a virtual computer workstation that is provided. The use of a virtualization system means that it is also possible for the second computer, that is to say particularly a host computer, to prompt secure separation of the operating system of one user from operating systems of other users or from the operating system of the host computer. In addition, the method therefore becomes largely independent of the computation power of a first computer used for access since all user-related processes run on the virtual computer workstation of the second computer.

Advantageously, the program code executed for the purpose of setting up the data link can likewise be stored in the write protected area of the removable storage medium and executed under the control of the auxiliary operating system. In this case, there is no possibly time-consuming and perhaps insecure download of program code for setting up the data link.

An explicit identifier for the removable storage medium or for a user may be transmitted from the first computer to the second computer, and the explicit identifier may be checked by the second computer using a set of valid identifiers, with access to the main operating system being prevented if the check fails. The transmission and checking of an explicit identifier for the removable storage medium or for a user allows the main operating system to be protected against illegal access operations. In this case, it is possible to use a large number of different authentication methods which ensure a high level of security irrespective of the hardware or software of the access computer. The removable storage medium also makes no or only low demands on the hardware since most known removable storage media already have a preprogrammed hardware identifier that cannot be changed.

We also provide a removable storage medium having at least one write protected memory area and an auxiliary operating system stored in the write protected memory area, wherein the write protected memory area stores program code for executing the following steps:
 the auxiliary operating system loaded from the removable storage medium is executed on a first computer;
 a data link between the first computer and a second computer is set up via a data network under the control of the auxiliary operating system;
 inputs from a user on the first computer are transmitted via the data link to a main operating system that is executed on the second computer; and
 outputs from the main operating system that are transmitted via the data link are output by the first computer.

Such a removable storage medium is suitable to implement the method cited above. Everything that a user requires to securely access an operating system on a host computer is stored on the removable storage medium securely and in a manner free from viruses.

The removable storage medium may comprise at least one area not write protected for storing user data and/or temporary data from the auxiliary operating system. The provision of an additional area not write protected allows further data which are required by the user or by the auxiliary operating system to be stored outside the protected memory area of the removable storage medium.

The auxiliary operating system stored in the write protected area may be independent of a system configuration of the first computer. Such a removable storage medium allows the greatest possible flexibility to access the main operating system of the second computer.

Further advantages are described in the examples described below.

FIG. 1 schematically shows an arrangement comprising an access computer 1 and a host computer 2. In the example, the access computer 1 and the host computer 2 connect to one another via a data network. The access computer 1 connects to the global internet 3. The host computer 2 indirectly likewise connects to the internet 3 via a company network 4. The access computer 1 has, inter alia, a processor 5, a hard disc 6, a graphics component 7, such as an incorporated graphics unit of a chipset or a separate graphics card, a USB interface controller 8 and a network interface controller 9. The graphics component 7 has a display unit 10, for example, an LCD screen, connected to it. The USB interface controller 8 has a keyboard 11 and a computer mouse 12, inter alia, connected to it. The network interface controller 9 couples the access computer 1 to the internet 3, for example, via a modem or a router in a home network.

In the scenario shown, the access computer 1 is additionally coupled to a removable storage medium 13 in the form of a bootable "USB flash device" (UFD) via the USB interface controller 8. The removable storage medium 13 comprises a write protected area 14 which stores software with program code to access the host computer 2. The design of the removable storage medium 13 and of the computer program code stored in the write protected area 14 will be described in more detail later with reference to FIGS. 2 and 3.

The host computer 2 runs a virtualization system 15. The virtualization system 15 is usually a software solution for particularly powerful computer systems such as, in particular, powerful server computers having a multiplicity of processors, for example, blade systems or cluster systems. The virtualization system 15 may comprise a standalone operating system to operate the host computer 2 or may be based on known operating systems such as the operating system BS2000/OSD from the Fijitsu Technology Solutions company. The virtualization system 15 provides virtual computer workstations 16a to 16c which behave in the manner of ordinary standalone computers for a user of the virtualization system 15. By way of example, each virtual computer system 16a to 16c can execute a separate operating system 17a to 17c prescribed by or for the user.

The virtualization system 15 comprises an optional access control 18 used to control the access by individual users to the virtual computer workstations 16 that are respectively associated with the users. If a user is unable to self-authenticate for the access control 18 in a suitable fashion, either the access to a virtual computer workstation 16 already running within the virtualization system 15 is prevented or virtualization of a computer workstation 16 is not started in the first place.

To protect the host computer 2 itself against attacks from the internet 3 as well as possible, a two-level security concept is pursued in the example shown. The host computer 2 is arranged behind a first "firewall" 19, which monitors and possibly filters out access operations from the internet 3 to the portion of the company network 4 in which the host computer 2 is arranged. In front of the first firewall 19, there is what is known as a demilitarized zone 20 (DMZ). Arranged within the demilitarized zone 20 is a DMZ host computer 21 which can be reached from the internet 3 and which is used, inter alia, for an upstream check on connection requests by the access computer 1. The DMZ host computer 21 itself connects to a publicly accessible portion of the internet 3 via a second firewall 22.

Figure 2:
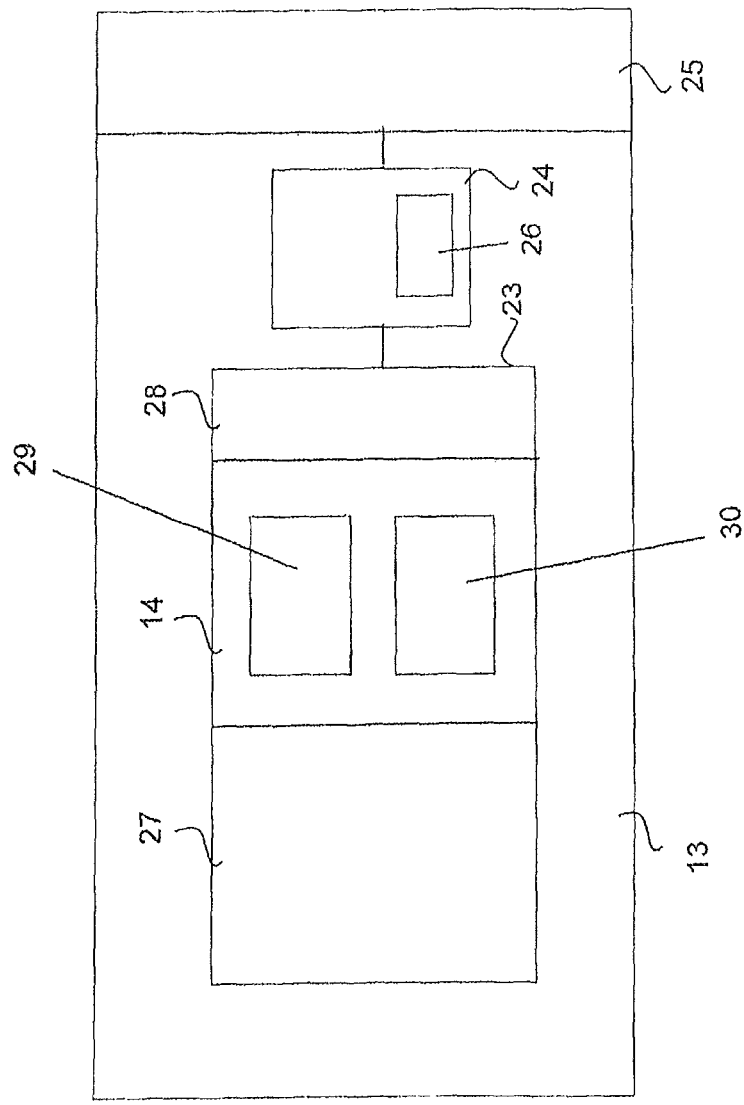
FIG. 2 shows a schematic illustration of a removable storage medium.

FIG. 2 schematically shows the design of the removable storage medium 13. The removable storage medium 13 comprises a nonvolatile memory 23 and a microcontroller 24. Furthermore, the removable storage medium 13 has a data interface 25, for example, a USB, FireWire or other mass memory interface. The microcontroller 24 is used to control and possibly prevent access operations by an access computer 1 to the nonvolatile memory 23 via the data interface 25. Furthermore, the microcontroller 24 can execute further tasks. These include, in particular, encryption or authentication of data by an encryption unit 26 integrated in the microcontroller 24. The encryption unit 26 may be in the form of an integrated or separate hardware unit or in the form of program code for encryption and decryption that runs on the microcontroller 24. Furthermore, the microcontroller 24 or other components of the removable storage medium 13 can undertake the function of a dongle to allow execution of the software stored in the nonvolatile memory 23 only on such access computers 2 as currently have the removable storage medium 13 connected to them.

In the execution area, the nonvolatile memory 23 comprises the write protected area 14, a memory area 27 not write protected and a read only memory 28. The read only memory 28 may also be in the form of memory separate from the nonvolatile memory area 23 in the removable storage medium 13.

The write protected memory area 14 stores a hardware-independent auxiliary operating system 29. By way of example, this is the Windows Preinstallation Environment (Windows PE) or Windows Embedded Standard Seven (Windows WES) from the Microsoft company. Furthermore, the write protected area 14 stores a piece of access software 30. The access software 30 comprises particularly program code to access a virtual computer workstation 16 of the virtualization system 15. In particular, it facilitates the connection setup and transmission of inputs and outputs between the access computer 1 and the virtual computer workstation 16. As described above, the auxiliary operating system 29 or the access software 30 can be linked to the removable storage medium 13 by suitable program code to retrieve an identifier or confirmation by the microcontroller 24.

The optional memory area 27, which is not write protected, stores work data for a user, settings data for the auxiliary operating system 29 or for the access software 30 or temporary data, for example. The likewise optional read only memory 28 may store an explicit identifier for the removable storage medium 13 or a secret key used for encryption by the encryption unit 26, for example.

Figure 3:
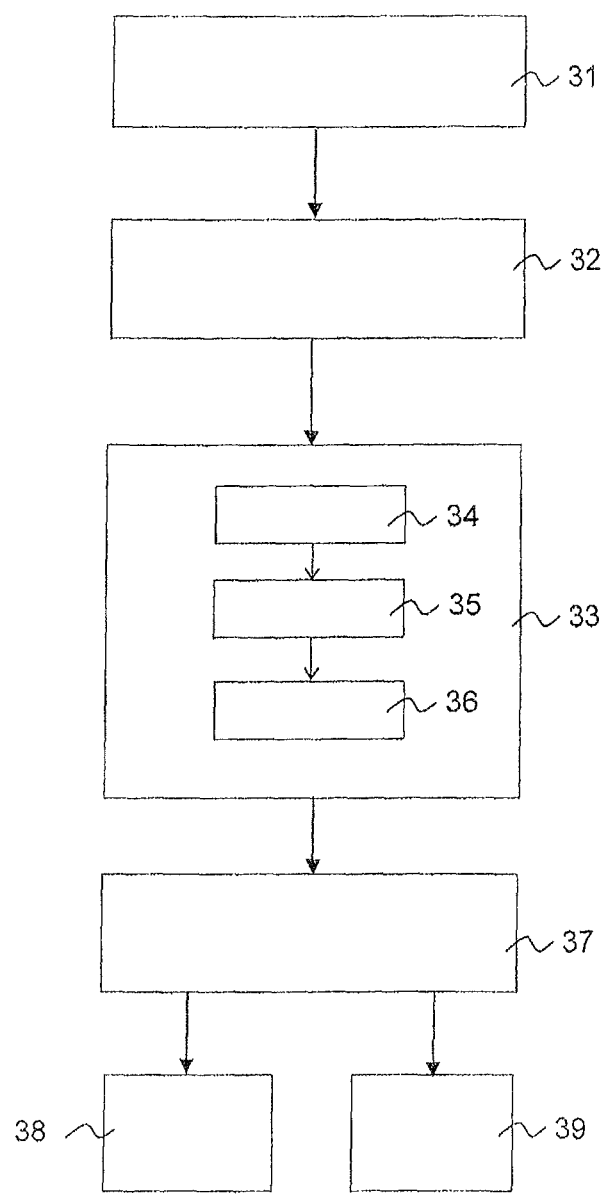
FIG. 3 shows a flowchart for a method to securely access an operating system.

FIG. 3 shows a flowchart for a method of securely accessing an operating system. The method described below is suitable to access one of the operating systems 17a to 17c of the virtual computer workstations 16a to 16c, for example.

In a first step 31, the auxiliary operating system 29 is loaded from the write protected area 14 of the removable storage medium 13 onto the access computer 1. To this end, the removable storage medium 13 connects to a free USB interface or a similar suitable data interface before the access computer 1 is actually started. The access computer 1 is then started, with the auxiliary operating system 29 being loaded from the storage medium 13 into the main memory thereof. An operating system which is possibly stored on the hard disk 6, and the type and security condition of which are possibly unknown, is not loaded, on the other hand.

In a subsequent step 32, the loaded auxiliary operating system 29 is executed by the access computer 1. To this end, particularly the program code which the auxiliary operating system 29 contains is executed by the processor 5 of the access computer 1. By way of example, the access computer is booted with a standard environment having restricted functionality. Optionally, the auxiliary operating system 29 itself may contain an access control which, by way of example, asks a user to input a valid password before further processes are executed.

In a further step 33, a data link is set up between the access computer 1 and the host computer 2. In the example shown, step 32 comprises a plurality of substeps.

On the basis of a first substep 34, the access software 30 is loaded from the write protected area 14 into the access computer 1, where it is executed by the processor 5.

In a subsequent substep 35, access data which are required to set up the data link are loaded. By way of example, the access data can be loaded from the write protected area 14 or the area 27—which is not write protected—of the removable storage medium 13. If such access data change dynamically, however, it may be advantageous for the access data to be loaded dynamically by the internet 3. In the security architecture shown in FIG. 1, the access data are provided by the DMZ host computer 21, for example. To this end, the access software 30 first sets up a first data link to the DMZ host computer 21, which is arranged in the demilitarized zone 20 and has a fixed access address, for example. The DMZ host computer 21 then checks an identifier for the removable storage medium 13 or a message coded by the encryption unit 26, for example, and transmits the data required to access the host computer 2 only following successful authentication of the removable storage medium 13. By way of example, the DMZ host computer 21 can provide data to set up what is known as an IP tunnel between the host computer 2 in the protected area of the company network 4 behind the first firewall 19 and the access computer 1.

In a subsequent substep 36, the access software 30 can then use the loaded access data to set up a connection, for example, via an IP tunnel to the host computer 2 and particularly to the virtualization system 15 thereof. Setting up the data link between the access computer 1 and the host computer 2 possibly requires fresh authentication, either with the same identifier or the same password or an additional password. By way of example, the access control 18 can request the input of a user name and a password from the user of the access computer 1, the input being matched using a local user database for the host computer 2 or for the virtualization system 15. Alternatively or in addition, the use of certificates stored in the removable storage medium 13 to authenticate the user or the removable storage medium 13 to the host computer 2 is also possible. If the transmission of passwords or certificates involves the use of a secure connection, such as an SSL-protected https connection, then the security level can be increased still further.

Furthermore, the use of a onetime password for authentication is also possible to obtain an even higher security level. To this end, the storage medium 13 may take a secret key, preferably stored in the write protected area 27 or the read only memory 28, as a basis for producing a new onetime password at regular intervals of time or for each access. In various examples, the onetime password produced is either read directly by the access software 30 and the microcontroller 24 and transmitted to the host computer 2 or is output on a display incorporated in the removable storage medium and is input by a user into an appropriate input mask, for example, an authentication page on the host computer 2, which authentication page is transmitted via an https connection and is presented in a web browser on the access computer 1 for the purpose of access control.

Substep 36 may involve setting up a data link protected by encryption, with parameters or keys for encryption being contained in the loaded access data, in the write protected area 27 or in the read only memory 28. When encryption and decryption are performed by the encryption unit 26 of the removable storage medium 13, the access computer 1 cannot obtain any knowledge of the key used. It goes without saying that encryption can alternatively or additionally also be performed by software either by the microcontroller 24 or by a processor of the access computer 1.

Once the connection has been set up and the user successfully authenticated, the operating system 17 is executed in step 37. By way of example, a virtual computer workstation 16 can be set up within the virtualization system 15 and an operating system 17*a* provided for the user can be loaded into the virtual computer workstation 16*a*. It goes without saying that it is also possible for an operating system already executed on the host computer 2 to be enabled just for the user of the access computer 1.

In the next step 38, data input by the user of the access computer 1, for example, using the keyboard 11 or the computer mouse 12, are transmitted to the host computer 2 and the operating system 17*a* running therein via the access software 30. By way of example, the remote desktop protocol (RDP) is suitable. The operating system 17*a* reacts to the user inputs and produces output data, for example, compressed video data, which are returned to the access software 30 via the data link in step 39. The access software 30 provides the outputs from the operating system 17*a* for the user by the graphics component 7 and the display unit 10 on the access computer 1.

Steps 38 and 39 are performed in parallel with one another and progressively until the connection is terminated by the user of the access computer 1 or by a control component of the host system 2 or of the virtualization system 15.

The arrangement, apparatuses and methods described have the advantage that access to the virtual computer workstations 16 or an operating system 17 running therein can be performed irrespective of the specific configuration of the access computer 1 and, in particular, with security against viruses which may be present thereon. In this way, it is possible for a user to access his known work environment, which forms part of the virtual computer workstation 16, from everywhere. Such access can be effected from a home computer with an internet connection or else from an internet PC on the move, for example.

The invention claimed is:

1. A computer arrangement comprising:
   a first computer comprising a USB interface, a network interface and a processor configured to execute an auxiliary operating system;
   a second computer comprising at least one processor configured to execute a main operating system, wherein the second computer runs a virtualization system to provide virtual computer workstations, and the main operating system is executed on a virtual computer workstation;
   a removable storage medium connected to the USB interface of the first computer, the removable storage medium comprising at least one write protected memory area comprising an auxiliary operating system and access software that sets up a data link between the first computer and the second computer; and
   the removable storage medium further comprising 1) at least one memory area not write protected that stores user data and/or temporary data and/or settings data from the auxiliary operating system; and 2) at least one microcontroller that controls access operations by the first computer to the at least one write protected memory area and the at least one memory area not write protected, the microcontroller comprising an encryption unit configured to encode or decode the data link protected by encryption;

wherein the first computer loads the auxiliary operating, system from the write protected memory area of the removable storage medium upon start of the first computer;

the first computer executes the auxiliary operating system;

the first computer loads the access software from the write protected memory area of the removable storage medium;

the first computer executes the loaded access software on the first computer under control of the auxiliary operating system;

the first computer sets up a first connection to a third computer, arranged in a demilitarized zone, having a predetermined address stored on the removable storage medium;

the first computer transmits an explicit identifier for the removable storage medium to the third computer;

the third computer checks the explicit identifier using a set of valid identifiers;

the third computer transmits access data for setting up an IP tunnel between the second computer and the first computer to the first computer if the checking of the explicit identifier was successful;

the first computer sets up a secure second connection between the first computer and the second computer via the IP tunnel by using the transmitted access data without further involving the third computer, the second computer being arranged in a protected zone;

the second computer requests the input of a user name and a password to grant access to the virtual computer workstation; and the access software provides access to the virtual computer workstation of the virtualization system, on which the main operating system is executed.

2. The computer arrangement according to claim 1, wherein the auxiliary operating system stored in the write protected memory area of the removable storage medium is independent of a system configuration of the first computer.

3. The computer arrangement according to claim 2, wherein the auxiliary operating system stored in the write protected memory area is one of Windows Preinstallation Environment (Windows PE) and Windows Embedded Standard Seven.

4. The computer arrangement according to claim 1, wherein the microcontroller of the removable storage medium functions as a dongle to allow execution of the auxiliary operating system and/or the access software on the first computer only if the removable storage medium is currently connected to the USB interface of the first computer.

5. The computer arrangement according to claim 1, wherein the removable storage medium further comprises a read only memory area storing an explicit identifier for the removable storage medium and/or parameters or keys for encryption.

6. The computer arrangement according to claim 1, wherein the password is a onetime password, produced by the removable storage medium at regular intervals of time or for each access, and the onetime password is either directly read by the access software and the microcontroller and transmitted to the second computer or is output on a display incorporated in the removable storage medium and is input by a user.

7. A method of accessing an operating system in a distributed computer arrangement comprising:

loading an auxiliary operating system from a write protected area of a removable storage medium by a first computer upon start of the first computer;

executing the loaded auxiliary operating system on the first computer;

setting up a data link between the first computer and a second computer via a data network under control of access software stored in the write protected area of the removable storage medium;

executing a main operating system on the second computer, wherein the second computer runs a virtualization system to provide virtual computer workstations, and the main operating system is executed on a virtual computer workstation;

accessing the virtual computer workstation, on which the main operating system is executed, from the first computer with the access software, the second computer requesting the input of a user name and a password to grant access; and progressively transmitting inputs from a user from the first computer via the data link to the main operating system, and progressively transmitting outputs from the main operating system via the data link to the first computer;

storing user data and/or temporary data and/or settings data from the auxiliary operating system on a memory area not write protected of the removable storage medium;

controlling access operations to the write protected memory area and to the memory area not write protected by a microcontroller; and protecting the data link by encryption by encoding or decoding the data link with an encryption unit of the microcontroller;

wherein setting up the data link comprises:
loading the access software from the write protected memory area of the removable storage medium;
executing the loaded access software on the first computer under control of the auxiliary operating system;
setting up a first connection to a third computer, arranged in a demilitarized zone, having a predetermined address stored on the removable storage medium;
transmitting an explicit identifier for the removable storage medium from the first computer to the third computer;
checking the explicit identifier by the third computer using a set of valid identifiers;
transmitting access data from the third computer to the first computer to set up an IP tunnel between the second computer and the first computer if the checking of the explicit identifier was successful; and
the first computer setting up a secure second connection between the first computer and the second computer via the IP tunnel by using the transmitted access data without further involving the third computer, the second computer being arranged in a protected zone.

8. The method according to claim 7, further comprising:
transmitting an explicit identifier for the removable storage medium or for a user from the first computer to the third computer; and checking the explicit identifier by the third computer using a set of valid identifiers, and preventing the transmission of access data from the third computer to the first computer if the check fails.

9. The method according to claim 7, wherein setting up the data link comprises:
   loading access data for setting up a secure data link from the third computer; and
   establishing a secure connection between the first computer and the second computer with the loaded access data.

10. The method according to claim 7, further comprising:
   transmitting a certificate stored on the removable storage medium and/or an explicit identifier for the removable storage medium and/or for a user, from the first computer to the second computer; and
   checking the certificate and/or the explicit identifier with the second computer using a public key associated with the certificate or using a set of valid identifiers, and preventing access to the main operating system if the check fails.

\* \* \* \* \*